United States Patent
Benco

(10) Patent No.: US 6,947,525 B2
(45) Date of Patent: Sep. 20, 2005

(54) MONITORING SYSTEM FOR A REMOTE TELEPHONE STATION

(75) Inventor: David S. Benco, Winfield, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 277 days.

(21) Appl. No.: 10/324,364

(22) Filed: Dec. 20, 2002

(65) Prior Publication Data

US 2004/0120471 A1 Jun. 24, 2004

(51) Int. Cl.⁷ .......................... H04M 1/24; H04M 3/08; H04M 3/22
(52) U.S. Cl. ...................... 379/35; 379/32.01
(58) Field of Search ............... 379/7, 32.01, 32.04, 379/35; 455/405, 410

(56) References Cited

U.S. PATENT DOCUMENTS

| | | | |
|---|---|---|---|
| 5,590,171 A | * | 12/1996 | Howe et al. ............... 379/33 |
| 5,757,889 A | * | 5/1998 | Ohtake .................... 379/32.02 |
| 5,930,698 A | * | 7/1999 | Bertacchi ................. 455/405 |
| 6,549,613 B1 | * | 4/2003 | Dikmen .................... 379/70 |
| 6,823,185 B1 | * | 11/2004 | Comer et al. ............. 455/427 |

FOREIGN PATENT DOCUMENTS

| | | |
|---|---|---|
| EP | 0 680 190 | 11/1995 |
| EP | 0 981 238 | 2/2000 |
| WO | WO 97/41678 | 11/1997 |
| WO | WO 00/05863 | 2/2000 |

\* cited by examiner

Primary Examiner—Binh K. Tieu

(57) ABSTRACT

An advanced call monitoring feature which adds an active voice path only between the called party, e.g. a victim, and the monitoring party so remote location of the called party and the monitoring personnel. The active voice path allows monitoring personnel to give instructions or encouragement the called party during lulls in the conversation with the calling party, thus the law enforcement personnel can be actively engaged in the call between the calling party and the called party, even though the monitoring station may be many miles away. This new feature functionality enhances the capabilities and utility of CALEA monitoring.

20 Claims, 3 Drawing Sheets

MONITORING SYSTEM FOR A REMOTE TELEPHONE STATION

BACKGROUND OF THE INVENTION

This invention relates to telecommunications and, more particularly, to a telecommunication monitoring system which monitors both fixed and mobile systems.

The rapid pace of innovations and technological advances within the telecommunication industry has severely challenged the law enforcement community ability to conduct authorized electronic surveillance in order to monitor criminal activity over telecommunication resources. Resources such as wireless telephones, cellular telephones, wideband wireless telephones, packet data networks that send voices and/or messages over multiple routes over a network having multiple paths, all make monitoring very difficult. In 1994 the Communications Assistance for Law Enforcement Act, hereinafter referred to as CALEA, was enacted to require carriers to assist authorized surveillance.

CALEA requires telecommunications carriers to ensure that the carriers' equipment, facilities, and services are able to comply with authorized electronic surveillance orders. At least since Jun. 30, 2000, a known and used surveillance system that complies with CALEA is the passive monitoring of voice paths system shown in FIGS. 1 and 2.

FIG. 1 shows a system 100 of equipment for use by authorized personnel to monitor a call from a calling party to a called party. The system 100 has a station 104, which is used by the calling party who often is a crime suspect. Calling station 104 is connected to the public switched telephone network (PSTN) 108. Calling station 104 is shown as a typical fixed telephone connected by a wire 106 to PSTN 108, but station 104 could also be a wireless station, an Internet net-to-telephone station or a pay telephone depending on the character of the suspected activity of the calling party. For example, a member of organized crime might have the calling station 104 at his or her home, the location of which does not help law enforcement in fighting organized crime since such locations are already known. On the other hand, if a kidnapper is using station 104 he or she would want to keep his or her location and identity secret since finding a kidnapper often leads to finding the kidnapper's victim. So when a criminal suspect wants his or her, location a secret, he or she can use a pay telephone and keep the session short to keep law enforcement from determining the pay telephone location. Another way for a criminal suspect can keep his or her location and identity secret is to use stolen wireless telephones and keeps the session short since wireless telephone location techniques are easier and faster than pay telephones. It is worth noting that no matter what kind of telephone the criminal suspect uses, calling station 104 is connected to the PSTN 108.

PSTN 108 is connected by means of telecommunications switch 110 in one way or another to the called party station 114. Most times the location of the called party station 114 and the identity of the called party are known to monitoring the party. Typically the called party knows the called party station 114 is being monitored, but in some cases the called party does not know that. As before in the case of organized crime, the called party at the called station 114 might not know he or she is being monitored, but in organized crime cases, the called party might expect one or both ends of conversation to be monitored. Because monitoring is expected, the called party might take precautions such as use a wireless telephone of the cellular or wideband handheld communication device, and move around in order to make possible monitoring attempts difficult. For such cases, it is important to monitor mobile called party telephones.

The more challenging situation for monitoring personnel is not an uncommon one. This situation occurs when the called party is a victim of criminal activity. In such a situation, the called party at station 114 knows about and agrees to monitoring by a law enforcement party at monitoring station 116. For existing monitoring arrangements, most often the law enforcement party is located nearby. Monitoring, as shown in FIGS. 1 and 2, is provided by the switch 110. The switch 110 is connected to both the called station 114 and the monitoring station 116. The bridge 111 in FIGS. 1 & 2 is part of the switch 110. The connections between the switch 110 and the stations 114 and 116 are by means of the all encompassing PSTN 108. The specific connection between station 114 and station 116 is by a bridge 111, which can be part of switch 110, or it can alternatively be an adjunct unit to switch 110.

FIG. 2 shows a simplified operation of the known monitoring system 100. The typical monitoring situation, as shown by the first row of FIG. 2, has calling station 104, usually operated by a criminal; called station 114, usually operated by a victim or co-criminal; and monitoring station 116 monitored by law enforcement personnel. As shown by the second row of FIG. 2, calling station 104 is lifted off-hook and calls the called station 114. The call causes called station 114 to ring according to typical operation. Atypically, except for CALEA or similar monitoring, bridge 111 also sends a separate ring signal to monitoring station 116 to alert the monitoring personnel of the incoming call without providing a ring-back signal to either the calling station 104 or the called station 114. As shown by the third row of FIG. 2, station 116 going off-hook to "answer" the call does not affect the ringing of station 114 or the ring back tone heard at calling station 104, but it does stop the ringing at station 116. At this point, station 116 has a "passive" connection to calling station 104, so the ring back tone of station 114 can be heard over this passive connection, as shown in the third row of FIG. 2. If station 114 goes off-hook to answer the incoming call, a "normal" connection will be connected between station 104 and station 114. At the same time, bridge 111 will maintain the passive connection to station 116 so both sides of the call can be heard by monitoring personnel, but spoken words and/or background noises at station 116 are isolated from station 114 and station 104.

In normal monitoring situations, called party at station 114 is located nearby to station 116. The nearby location of monitoring station 116 is an expediency since in the known monitoring system 100 the monitoring station 116 is for listening-only, communication between law enforcement personnel and the called party is by whispers, notes or gestures, all of which must be located nearby. All because monitoring station 116 does not have an outbound voice path that accepts voice or other sound inputs from monitoring personnel to the called party. Such whispers, signs and gestures are stressful to the called party when he or she is on a two-way conversation with the calling party and at the same time trying to understand what the monitoring personnel want the called party to say to the calling party. Additionally, with the popularity of hand-held and car-mounted wireless telephones, the called station 114 could be in a car or in a park, so wireless telephones may mean whispers, signs and gestures would be very difficult and very impractical to provide by the monitoring personnel. Without the close proximity and communication of the called party with the law enforcement, monitoring personnel; critical instructions and encouragements to the called party (often a victim) are not available in the known system 100.

SUMMARY OF THE INVENTION

The above problems are solved, and a number of technical advances are achieved in the art, by a monitoring system that provides capabilities and services beyond the existing ones. This is accomplished by providing an additional secure voice path for an affected call and an ability to support a monitoring station which is used by monitoring personnel. This monitoring can be accomplished at a location that is remote from the called stations if circumstances require such.

In accordance with one aspect of the invention a method for monitoring calls is provided, having a step of setting up a secure voice path to a monitoring station after an identified call is set up between a calling station and a called station. This secure voice path makes both sides of the call available at the monitoring station without being detectable. The method also has a step of providing a voice path between the called station and the monitoring station. The voice path from the monitoring station to the called party station enables instructions and encouragement to the called party without the knowledge of the calling party.

In accordance another aspect of the invention, a system is provided including a first station calling a second station causing a ringing signal to be sent to the second station; a bridge connecting the second station to a third station causing a second ringing signal at the third station. The bridge isolates the ringing signal of the second station from the ringing signal of the third station such that answering a call at the third station before the call is answered at the second station will not affect the ringing at the second station. The bridge also connects the third station to the second station after the third station goes off-hook to answer the call in order to passively monitor a voice path between the first station and the second station. Further, after the second station goes off-hook to answer the call, the bridge connects an active voice path between the third station and the second station such that signals from the handset of the third station are bridged to the second station without the signals being connected to the first station.

In accordance with another aspect of the invention, the shortcomings of the art are overcome and an advance in the technology achieved by providing a system including a first station calling a second station causing a ringing signal to be sent to the second station; a bridge connecting the second station to a remote third station causing a second ringing signal at the remote third station. The bridge isolates the ringing signal of the second station from the ringing signal of the remote third station such that answering a call at the third station before the call is answered at the second station will not affect the ringing of the second station. The bridge additionally connects the remote third station to an aural portion of the second station after the remote third station goes off-hook to answer the call in order to passively monitor the call voice path between the first station and the second station. Further, after the second station goes off-hook to answer the call, the bridge connects an active voice path between the remote third station and the second station such that signals from the handset of the remote third station are bridged to the second station without the signals being connected to the first station. This active voice path is between the third station and the second station even when mobile telephone equipment is used by the called party at a location that is remote to the third station.

BRIEF DESCRIPTION OF THE DRAWINGS

The foregoing advantageous features of the invention will be described in detail and other advantageous features will be made apparent upon reading the following detailed description that is given with reference to the several figures of the drawings, in which.

DETAILED DESCRIPTION

Figure 3:
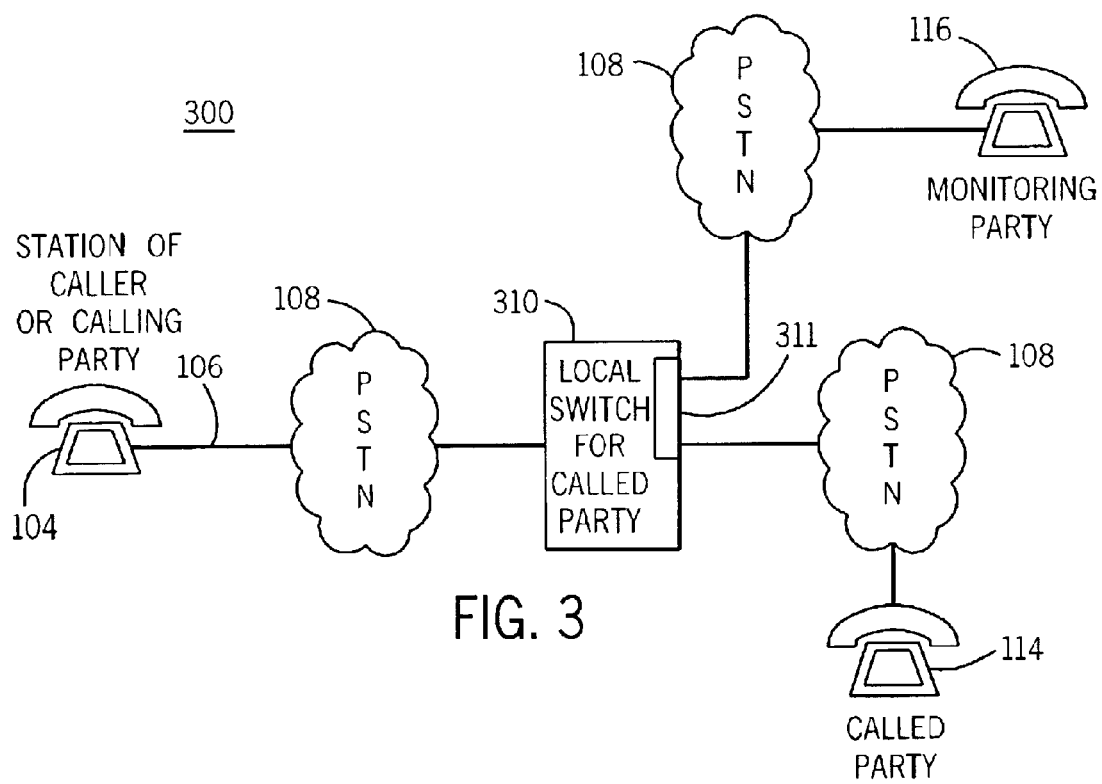
FIG. 3 is a block diagram of a system having a telecommunications switch, a station of a calling party under surveillance, a station of the called party and a station for monitoring according to an embodiment of the invention.

FIG. 3 shows an advance system 300 for providing for monitoring by authorized personnel of a call from a calling party to a called party. The system 300 has a first station 104, which is used by the calling party. For the arrangement 300, the calling party is typically a crime suspect. Station 104 is connected to the public switched telephone network (PSTN) 108. Station 104 is shown as a typical fixed telephone connected by a wire 106 to PSTN 108, but station 104 could also be a wireless station, an Internet net-to-telephone station or a pay telephone depending on the character of the type of activity undertaken by the calling party. If a criminal suspect wants his or her location to be unknown and the location of station 104 to be unknown, he or she may use a pay telephone and keep the call session short to keep law enforcement from determining the pay telephone's location. As mentioned above, another way for a criminal suspect to keep his or her location and identity secret is to use stolen wireless telephones and keep the call session short since wireless telephone location techniques can be easier and faster than that used to locate pay telephones. No matter what kind of telephone a criminal suspect uses, station 104 is connected to the PSTN 108.

Figure 1:
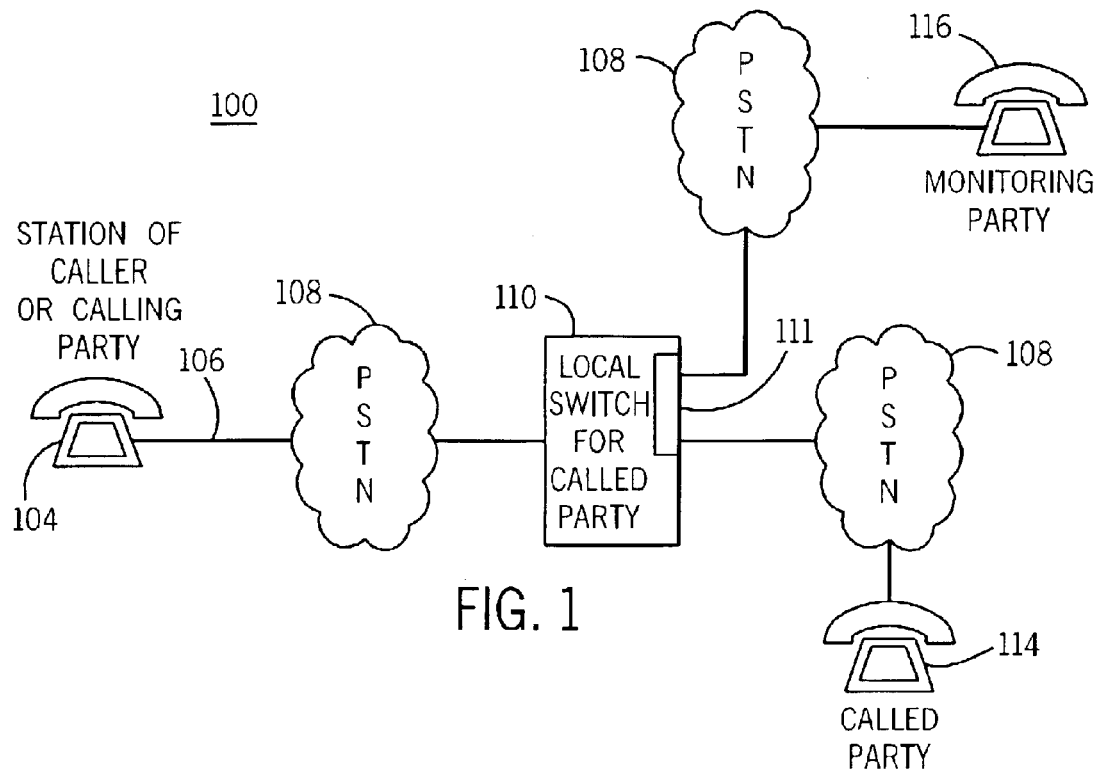
FIG. 1 is a block diagram of a system having a telecommunications switch, a station of a calling party under surveillance, a station of the called party and a station for monitoring.
Figure 2:
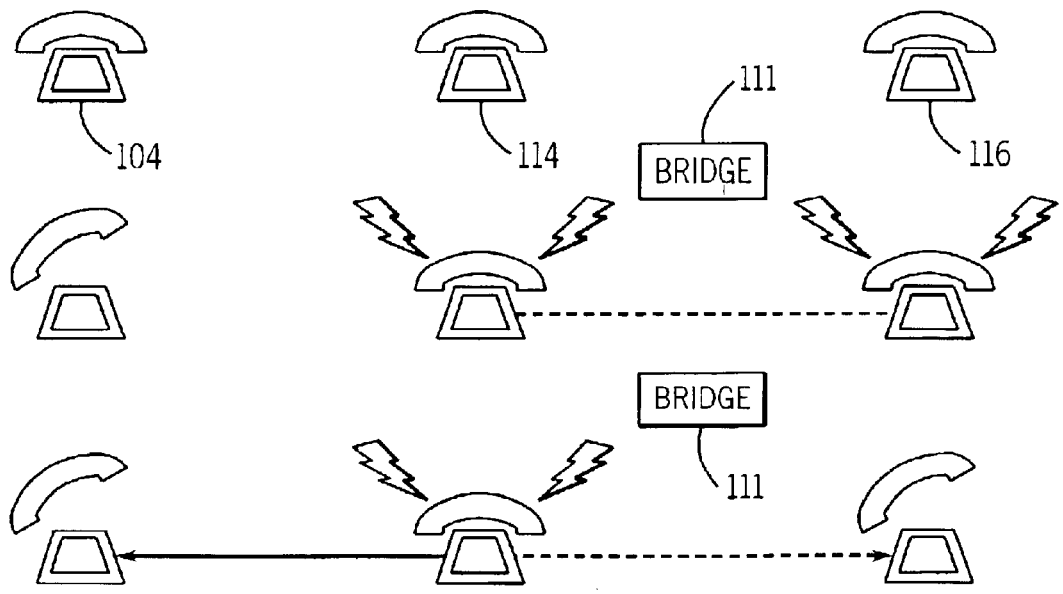
FIG. 2 is a simplified connection diagram illustrating the three stations in FIG. 1 and known interactions of the stations.
Figure 4:
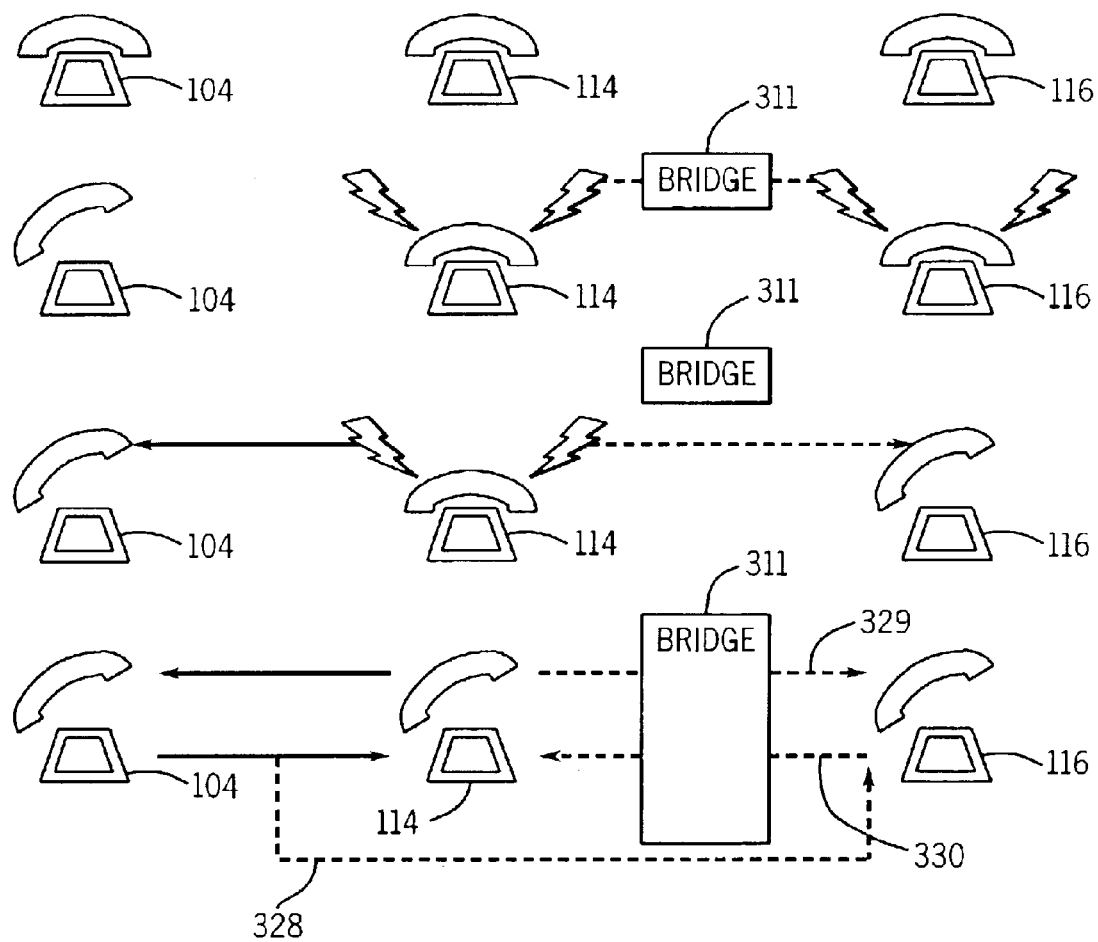
FIG. 4 is a simplified connection diagram illustrating the three stations in FIG. 3 and their interactions according to an embodiment of the present invention.

From the PSTN 108 the call progresses to a telecommunications switch 310. Telecommunications switch 310 is very similar to telecommunications switch 110 in FIG. 1, one difference being an improved bridge 311. The bridge 311 has all the features of the bridge 111, such as passive listening paths 328 and 329 to listen to the conversation between calling party at station 104 and called party at station 114, and an isolated ringing signal to the monitoring station 116 that does not ring back to either station 104 or station 114, but also has an active voice path 330 shown in FIG. 4 from monitoring station 116 to called station 114 that can only be heard at called station 114. This additional active voice path 330 provides a channel to the called station 114 for help and/or instructions to be given to the called party by the monitoring personnel at station 116. This active channel 330 from monitoring station 116 to called station 114 also permits remote location of monitoring station 116. Thus, even though the calling party in an attempt to avoid monitoring forces reception of the call by the called party on a pay telephone or a cellular telephone by threats of harm, help and instructions can still be secretly voiced to the called party by remote monitoring personnel according to an embodiment of the present invention. If the called station 114 has advanced features, such as call waiting, automatic call forwarding, or even messaging, the bridge 311 inserts the monitoring station with the same advanced features and the secure passive and active voice paths between ultimately called station 114 and the monitoring station 116, all without detection by the calling party.

While the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention are thus within its spirit and scope.

What is claimed is:

1. A method for monitoring a telephone call, comprising the steps of:

recognizing the telephone call as an identified telephone call from a station under surveillance;

setting up the identified telephone call to a second station;

after the identified telephone call is set up and connected between the station under surveillance and the second station, setting up a secure passive voice path to a monitoring station; and connecting a secure active voice path between the second station and the monitoring station.

2. The method of claim 1, further comprising the step of:

monitoring the identified telephone call by the secure passive voice path and voicing support by the secure active voice path.

3. The method of claim 2 wherein the monitoring station is at a separate location from the second station.

4. The method of claim 3 wherein the separate location of the monitoring station is remote geographically from the second station and the secure active voice path connecting step comprises bridging connections for active monitoring voice paths from the second station to the monitoring station.

5. The method of claim 4 wherein the second station is a wireless station.

6. The method of claim 4 wherein the bridging step further comprises an additional incoming call to the second station requiring monitoring by the monitoring station.

7. The method of claim 6 wherein the bridging step includes monitoring the additional incoming call to the second station at the monitoring station.

8. The method of claim 7 wherein the bridging step includes inserting the bridge into the ring and voice path from the second station to the monitoring station.

9. The method of claim 1 wherein the geographic separation between the second station and the monitoring station is up to a plurality of miles.

10. The method of claim 1, wherein the second station comprises call waiting, automatic call forwarding, and/or messaging features, the method further comprising the step of:

inserting the monitoring station with the same features as the second station.

11. The method of claim 1, wherein the step of connecting the secure active voice path between the second station and the monitoring station comprises the step of:

connecting a secure active voice path from the monitoring station to the second station, wherein signals from the monitoring station are bridged to the second station without the signals being connected to the station under surveillance.

12. The method of claim 4, wherein the station under surveillance is one of: a fixed telephone, a wireless station, an Internet net-to-telephone station, or a pay telephone.

13. A system comprising:

a first station calling a second station causing a ringing signal to be sent to the second station;

a bridge connects the second station to third station causing a second ringing signal at the third station;

the bridge isolates the ringing signal of the second station from the ringing signal of the third station such that answering the call at the third station before the call is answered at the second station will not stop the ringing of the second station;

the bridge connects the third station to the second station after the third station goes off-hook to answer the call for passive monitoring of a voice path between the first station and the second station; and after the second station goes off-hook to answer the call, the bridge connects an active voice path between the third station and the second station such that signals from the handset of the third station are bridged to the second station without the signals being connected to the first station.

14. The system of claim 13 wherein the third station is at a remote location with respect to the second station.

15. The system of claim 13 wherein the bridge is a part of a switching system.

16. The system of claim 13 wherein the bridge is part of an adjunct to a switching system.

17. The system of claim 15 wherein the switching system inserts the bridge for all incoming calls requiring monitoring by means of the monitoring station.

18. The system of claim 15 wherein the switching system provides special treatment for calls that are to be monitored.

19. The system of claim 15 wherein the switching system inserts a bridge into the ring and voice path.

20. The system of claim 13, wherein the first station is one of: a fixed telephone, a wireless station, an Internet net-to-telephone station, or a pay telephone.

* * * * *